(12) United States Patent
Schimke et al.

(10) Patent No.: US 11,093,301 B2
(45) Date of Patent: Aug. 17, 2021

(54) INPUT OUTPUT ADAPTER ERROR RECOVERY CONCURRENT DIAGNOSTICS

(71) Applicant: International Business Machines Corporation, Armonk, NY (US)

(72) Inventors: Timothy J. Schimke, Stewartville, MN (US); Prathima Kommineni, Hyderabad (IN); John Wesley Walthour, II, Austin, TX (US); Syed Ataur Rehman, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 16/434,275

(22) Filed: Jun. 7, 2019

(65) Prior Publication Data

US 2020/0387410 A1    Dec. 10, 2020

(51) Int. Cl.
*G06F 9/54* (2006.01)
*G06F 9/455* (2018.01)

(52) U.S. Cl.
CPC .......... *G06F 9/541* (2013.01); *G06F 9/45558* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 7,093,154 B2* | 8/2006 | Bartfai | G06F 11/0709 714/2 |
| 8,006,133 B2* | 8/2011 | Cabezas | G06F 11/2221 714/25 |
| 8,347,142 B2* | 1/2013 | Cabezas | G06F 11/2221 714/25 |
| 8,489,699 B2 | 7/2013 | Goggin et al. | |
| 9,021,475 B2 | 4/2015 | Nimmagadda et al. | |
| 9,135,044 B2 | 9/2015 | Maharana | |
| 9,304,849 B2* | 4/2016 | Arroyo | G06F 11/0712 |

(Continued)

FOREIGN PATENT DOCUMENTS

EP    2835953 B1    10/2017

OTHER PUBLICATIONS

Reddy, "Hardware based I/O Virtualization technologies for Hypervisors, Configurations and Advantages—A study", 2012 IEEE International Conference on Cloud Computing in Emerging Markets (CCEM), Oct. 2012, 5 pages.

*Primary Examiner* — Umut Onat
(74) *Attorney, Agent, or Firm* — Nolan M. Lawrence (57) ABSTRACT

A request to perform a testing procedure on a multi-client adapter is received. The multi-client adapter is capable of hosting network connectivity for multiple clients simultaneously and operating within a computing system. A client adapter configuration for the multi-client adapter is determined. The client adapter configuration lists clients that are assigned to the multi-client adapter. The computer system is instructed to operate in an I/O error state. The computer system is instructed in response to the received request and based on the determined client adapter configuration. The I/O error state has a time frame for recovery of a first client of the clients assigned to the multi-client adapter. A first adapter test of the testing procedure is performed on the multi-client adapter during the time frame for recovery and based on the received request.

17 Claims, 3 Drawing Sheets

(56) References Cited

U.S. PATENT DOCUMENTS

| | | | |
|---|---|---|---|
| 9,323,620 B2 * | 4/2016 | Graham | G06F 11/1415 |
| 9,400,704 B2 | 7/2016 | Graham et al. | |
| 9,715,469 B1 * | 7/2017 | Arroyo | G06F 13/24 |
| 9,720,775 B2 * | 8/2017 | Arroyo | G06F 11/1471 |
| 9,720,862 B1 * | 8/2017 | Arroyo | G06F 11/142 |
| 10,042,720 B2 * | 8/2018 | Arroyo | G06F 9/45558 |
| 10,042,723 B2 * | 8/2018 | Arroyo | G06F 11/2007 |
| 2003/0101367 A1 * | 5/2003 | Bartfai | G06F 11/0709 |
| | | | 714/4.3 |
| 2011/0167293 A1 * | 7/2011 | Cabezas | G06F 11/2221 |
| | | | 714/3 |
| 2014/0372801 A1 * | 12/2014 | Graham | G06F 9/45558 |
| | | | 714/21 |
| 2015/0370642 A1 | 12/2015 | Arroyo et al. | |

\* cited by examiner

INPUT OUTPUT ADAPTER ERROR RECOVERY CONCURRENT DIAGNOSTICS

BACKGROUND

The present disclosure relates to input output adapters, and more specifically, to diagnostics and testing of input output adapters. Input output adapters are used in computers and computer systems. Input output adapters facilitate communication with other computer systems, devices, and computer accessories.

SUMMARY

Disclosed are a method, system, and computer program product according to some embodiments. A request to perform a testing procedure on a multi-client adapter is received. The multi-client adapter is capable of hosting network connectivity for multiple clients simultaneously and operating within a computing system. A client adapter configuration for the multi-client adapter is determined. The client adapter configuration lists clients that are assigned to the multi-client adapter. The computer system is instructed to operate in an I/O error state. The computer system is instructed in response to the received request and based on the determined client adapter configuration. The I/O error state has a time frame for recovery of a first client of the clients assigned to the multi-client adapter. A first adapter test of the testing procedure is performed on the multi-client adapter during the time frame for recovery and based on the received request.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to input output adapters, and more particular aspects relate to diagnostics and testing of input output adapters. While the present disclosure is not necessarily limited to such applications, various aspects of the disclosure may be appreciated through a discussion of various examples using this context.

Input output adapters (I/O adapters) include, but are not limited to, network adapters and storage adapters. I/O adapters can facilitate the communication of a computer system (computer) with other computers or devices. For example, a network card installed in a desktop computer system can provide a network connection. For a second example, a storage adapter installed in a desktop computer system permits the computer to read from and write to an attached storage device. For a third example, a converged network adapter in a computer provides access to network attached storage that hosts files for a plurality of devices and a storage attached storage device.

Another technology is platform virtualization of software and hardware. In platform virtualization, a computer system simulates an operating system running on a virtualized computer. A computer system can host a plurality of operating systems or other logical partitions (LPARs) and corresponding virtualized computers with a single set of computing hardware (e.g., processor, memory). In some cases, the sharing of computer hardware operates by a controlling partition. The demand for decreasing the cost of hardware incentives the use of a single computer to host the plurality of logical partitions.

In some situations, networking and platform virtualization has led to the development of virtualization of components of the computer system. For example, a multi-client capable I/O adapter (multi-client adapter) can provide the ability to serve multiple clients with fewer physical I/O adapters than the number of clients. In some situations, a single I/O adapter is configured to receive client communication requests from a plurality of client logical partitions hosted by the computer system. In some situations, a multi-client adapter leverages peripheral standards, such as client virtualization, not only within the adapter but along any bus or connector of the computer system.

One such technology is single root input/output (IO) virtualization (alternatively, SR-IOV or SRIOV). SRIOV is a PCI standard, providing an adapter technology building block for I/O virtualization within the PCI-Express (PCIe) industry. SRIOV capability is a feature of many PCIe adapters for Fibre Channel, Ethernet, Infiniband, and Converged Network Adapters (CNA).

In some cases, the SRIOV adapter has an I/O adapter virtualization architecture that allows a single adapter to be concurrently shared across many different logical partitions. The sharing is done at a physical level, such that each logical partition has access to a slice of the physical adapter. The sharing is accomplished via partitioning the adapter into multiple different PCI functions, and then distributing access to those functions. The adapter is presented as one or more physical functions (PFs) that control functions, for example, used for both configuration and I/O, and a set of virtual functions (VFs), used for I/O and limited configuration. Each VF represents a slice of the adapter capacity that can be assigned to a logical partition independently of other VFs. Each logical partition has a device driver for each of the VFs assigned to the logical partition.

There are some drawbacks related to I/O adapters. In some cases, I/O adapters are installed within a data center that has limited access control. This leads to drawbacks related to physical access and presence for testing. Data center I/O adapters often require cable disconnection and/or reconnection to facilitate testing through loopback cables or other devices (e.g., switches, routers). Access control can also require that individuals that wish to perform tests be not only on site, but also have the proper access control credentials to get to the I/O adapter. Another technical challenge is that I/O adapters are used in an enterprise environment, and consequently are serving clients that require high uptimes. A computer system may need to be disconnected from the network to allow for the following: client testing, client reconnection, and restored client availability. This may not be possible for some clients that must provide service twenty-four hours constantly, with only minor interruptions.

Drawbacks related to I/O adapters are exacerbated by multi-client adapters. Multi-client adapters configurations are large, complex, and growing increasingly so. Existing adapters already support tens of VFs per physical port, and in some cases hundreds of VFs. Existing diagnostic solutions require exclusive use of the physical port by the diagnostic functions. This forces a customer to do an adapter/system reconfiguration to first remove VFs prior to performing diagnostics, then rebuild the configuration afterwards. The complexity and time related to multiple reconfigurations are undesirable and limit the usage of diagnostic capabilities. Furthermore, the scope of a diagnostic action is increased over a non-multi-client adapter since many more partitions and users are impacted.

An I/O adapter that leverages error handling concurrent diagnostics (EHCD) overcomes the stated technical limitations. EHCD may operate by leveraging existing diagnostics. For example, EHCD may utilize existing tests and diagnostic operations without requiring the design of new tests. EHCD may operate on an I/O adapter configured to provide network access to a computer system. EHCD may operate on a multi-client capable I/O adapter that leverages existing peripheral protocols for I/O virtualization (e.g., an SRIOV adapter compliant with the PCI standard). EHCD may operate by an I/O adapter client operating under the belief that an I/O adapter is in an error state, when the I/O adapter is not in fact experiencing an error state.

EHCD may operate by instructing one or more logical partitions (clients) that there is an error condition. The clients may respond to the error condition by performing a recovery. During the recovery time frame the I/O adapter may begin and perform one or more tests and/or diagnostics related to the I/O adapter. Before the recovery of the one or more clients is finalized, diagnostics and testing may finish. The clients may be configured to automatically resume normal network operation after a recovery from the error condition.

Leveraging an I/O adapter with EHCD provides advantages over previous methods of testing, because diagnostics may be performed without physical access to a computer or I/O adapter. Further, the decreased amount of required reconfiguration may speed up testing cycles. For example, instead of taking tens of clients offline and reconfiguring the entire network adapter, as few as a single client may be put into a temporary error recovery. As EHCD may utilize existing error recovery protocols, I/O adapters may benefit because a system that is currently running does not need to be taken offline to be updated to use EHCD. Moreover, as existing error recovery protocols often end with the client resuming normal network operation, no reconfiguration of an I/O adapter may be necessary.

Further, new benefits may also be found utilizing EHCD with an I/O adapter. For example, because the computer system and I/O adapter are configured to automatically recover, testing can be automated. Further, because more diagnostics related I/O adapters are automated, human errors may be reduced. Another benefit is that because the computer system and I/O adapter are minimally invasive to the functioning of the clients, proactive testing may be performed. For example, an I/O adapter may be configured to periodically and proactively diagnose itself to identify an issue before it causes a significant downtime. In a second example, a test is performed during peak usage times of an I/O adapter, and consequently adapter issues that were not previously identifiable can be identified.

Figure 1:
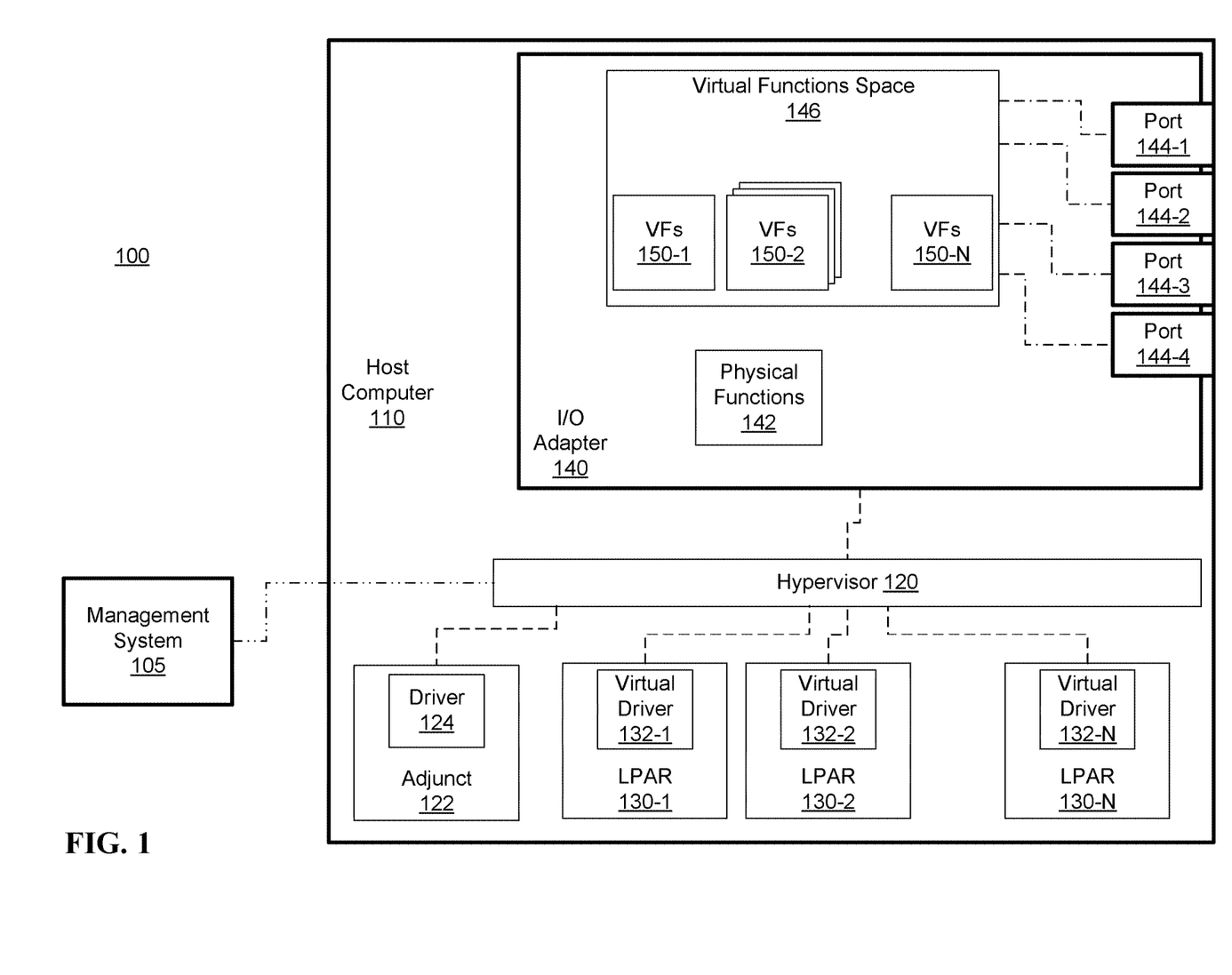
FIG. 1 depicts an example operating environment that utilizes error handling concurrent diagnostics, consistent with embodiments of the disclosure.
Figure 3:
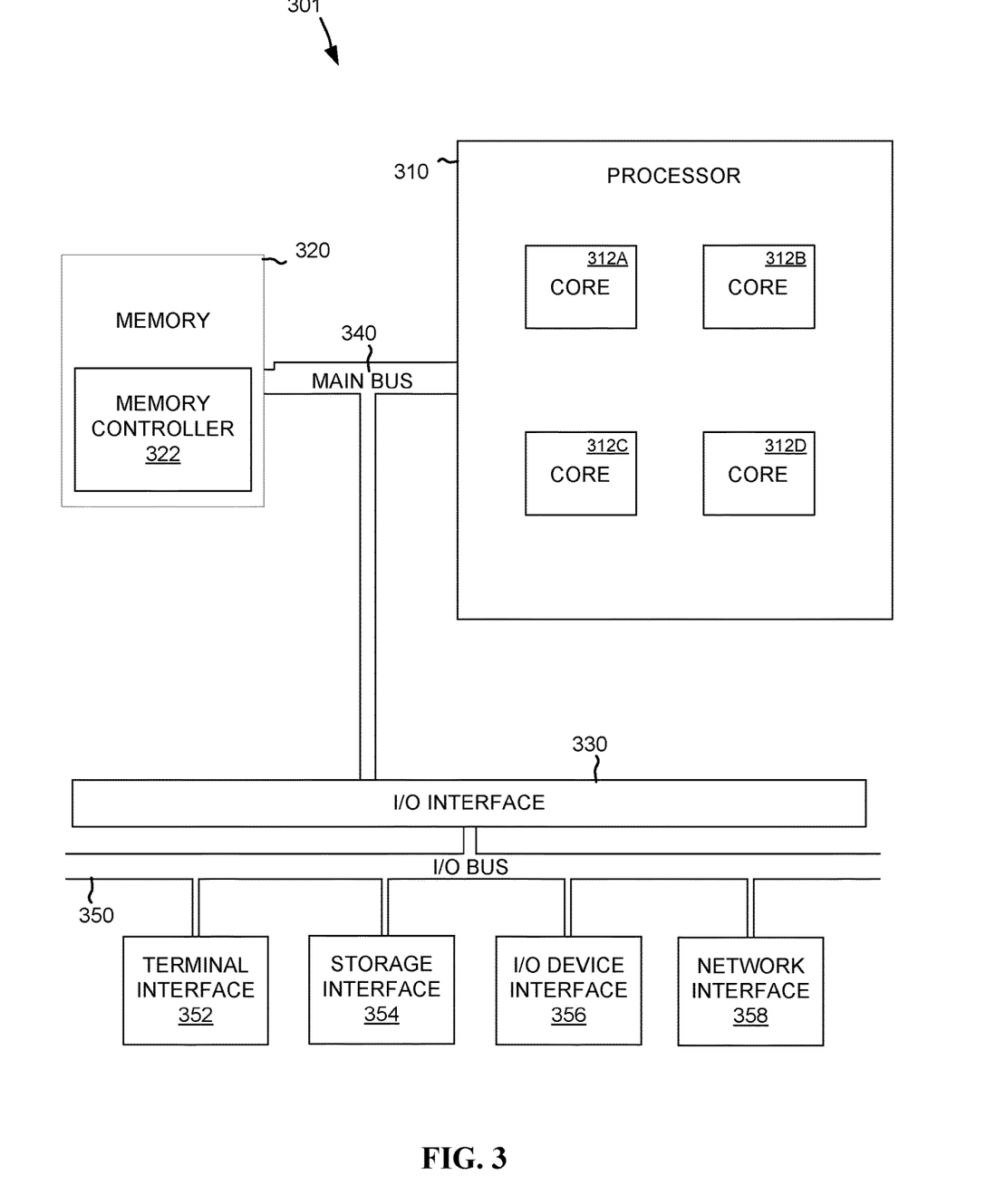
FIG. 3 depicts the representative major components of an example computer system that may be used, in accordance with embodiments of the present disclosure.

FIG. 1 depicts an example operating environment 100 that utilizes error handling concurrent diagnostics, consistent with embodiments of the disclosure. The operating environment includes a management system 105 and a host computer 110. The management system 105 is a computer system configured to interact with a user or administrator and facilitate communication with the host computer 110. In some embodiments, the management system 105 is integrally coupled to and forms part of the same computer system as the host computer 110. For example, a display and keyboard may be directly connected to the host computer 110. In some embodiments, the management system 105 is a separate computer from host computer 110. For example, the management system 105 may be a second computer system that is communicatively coupled to the host computer 110 by a network. FIG. 3 depicts a representative hardware capable of providing the management system 105. In some embodiments, a suite of software is installed upon the management system 105 for communication with the host computer 110. For example, management system 105 may include a console or terminal software and elevated privileges for communication with the host computer 110. The management system 105 may issue configuration changes to, and/or query operating status of, the host computer 110. The management system 105 may configured to enable a user to perform diagnostics including error handling concurrent diagnostics.

The host computer 110 is a computing device configured to virtualize computing resources. The computing resources may include a processor and memory (not depicted). A computer representative of the hardware resources is depicted in FIG. 3. The host computer 110 includes the following: a hypervisor 120 for virtualizing hardware resources; a set of one or more clients or logical partitions (LPARs) 130-1, 130-2, up to 130-N (collectively 130), and an I/O adapter 140 for providing input and output resources.

The hypervisor 120 is configured to provide computing resources to the LPARs 130, such as memory, processing, and I/O. The hypervisor 120 provides a computer platform that includes computer software, computer firmware, computer hardware, or some combination thereof. The hypervisor 120 presents an operating platform with virtualized hardware to each of the LPARs 130. The hypervisor 120 may utilize container technology to present only a subset of an operating platform to each of the LPARs 130.

The hypervisor 120 includes an adjunct 122 for communication with the I/O adapter 140. The adjunct 122 may be a software and/or hardware component of the hypervisor 120. In some embodiments, adjunct 122 is a logical partition hosted by the hypervisor 120; the adjunct having elevated privileges and access to the host computer 110 in relation to the LPARs 130. Though not depicted, the host computer 110 may include multiple adapters and there may be multiple adjuncts assigned to each of the adapters. In some embodiments, the hypervisor 120 may not include an adjunct and may communicate with the I/O adapter 140 solely. Hypervisor 120 may provide exclusive control to adjunct 122 for I/O adapter 140. For example, any request to communicate with I/O adapter 140, including by the hypervisor 120 itself may originate or be routed through adjunct 122. The adjunct 122 includes a physical device driver (alternatively, physical function or PF driver) 124. The PF driver 124 may have more capabilities than other drivers of the hypervisor 120. For example, a PF driver 124 may have access to all I/O capabilities of, as well as full configuration and control of, I/O adapter 140.

The LPARs 130 requests resources of the host computer 110. Each of the LPARs 130 hosts an operating system instance and communicates with the hypervisor 120 and the adjunct 122. The LPARs 130 may be sandboxed from each other and from the hypervisor 120. For example, processing cycles, I/O resources, and memory space of LPAR 130-1 may not be contiguous, overlapping, or accessible by any other of the LPARs 130. Further continuing the example, the LPARs 130 may not access any of the processing cycles, I/O resources, and memory space of the hypervisor 120 and the adjunct 122. Each hypervisor 130 includes a corresponding virtual device driver (alternatively, virtual function or VF driver) 130. For example, LPAR 130-1 includes a VF driver 132-1, and LPAR 130-2 includes a VF driver 132-2. Correspondingly, any additional LPAR hosted on the host computer 110 also includes a corresponding VF driver. For example, up to and including LPAR 130-N includes corresponding VF driver 132-N. The VR drivers 132 permit the LPARs 130 to communicate driver functions to the hypervisor 120 and/or the adjunct.

The I/O adapter 140 of the host computer 110 provides I/O resources to the host computer. For example, the I/O adapter 140 may be a network adapter and it may communicatively couple the host computer 110 to other computers or devices on a network (not depicted). The I/O adapter 140 includes the following: a series of physical functions 142 for configuration and settings changes, a plurality of I/O ports 144-1, 144-2, 144-3, and 144-4 (collectively 140), and a virtual function space 146 for hosting I/O clients. The physical functions 142 may be accessed by the adjunct 112 to leverage changing configuration or communicating with the hypervisor 120. For example, the adjunct 122 utilizes the PF driver 124 to assign one or more resources to a given LPAR 130 by altering the configuration of the I/O adapter 140 through calls to the physical functions 142. In response to the calls to the physical functions 142, the I/O adapter may allocate processing cycles and a memory space to one or more of the LPARs 130 to facilitate usages of one or more of the I/O ports 140.

The I/O adapter 140 is a multi-client adapter configured to host multiple clients simultaneously. Further, the I/O adapter 140 along with the hypervisor 120 virtualizes the entire stack of functionality of the I/O of the host computer 110. Host computer 110 may include a plurality of communication pathways (not depicted) communicatively coupling the LPARs directly with the I/O adapter 140. Each of the LPARs 130 may be assigned an identifier, and the I/O adapter 140 and the communication pathways may be aware of the identifiers of the LPARs through an adapter configuration (provided by the adjunct). Within the virtual function space 146 are a series of virtual functions (VFs) 150 for the LPARs 130. The virtual function space 146 includes resources (e.g., memory, processing cycles, I/O) for the I/O adapter 140 to facilitate communication through the I/O ports 144. In some embodiments, the hypervisor 120, the adjunct 122, a diagnostic LPAR (not depicted), or the I/O adapter 140 utilize the virtual function space 146 to facilitate communication through the I/O ports 144.

Each of the virtual functions 150 inside of the virtual function space 146 may be assigned to an individual LPAR 130. For example, LPAR 130-1 may be assigned to VFs 150-1, LPAR 130-2 may be assigned to VFs 150-2, and so on all the way to LPAR 130-N being assigned to VFs 150-N. To communicate using I/O adapter 140, a given LPAR 130 may utilize the corresponding VF driver 132 along with the assigned identifier, and the given LPAR consequently has access to the corresponding virtual functions 150. In some embodiments, different VFs 150 are assigned to different LPARs 130. For example, LPAR 130-1 may be assigned to VFs 150-1, which may include the ability to send and receive data to a network through port 144-1. In a second example, LPAR 130-2 may be assigned to VFs 150-2. VFs 150-2 may include the ability to send and receive data to a port 144-1, and to send and receive data to a port 144-3. VFs 150-2 may also include the ability to perform limited configuration changes to bridge ports 144-1 and 144-3 together or to separately communicate on ports 144-1 and 144-3.

The hypervisor 120 and/or adjunct 122 may operate during active network traffic to provide error handling concurrent diagnostics of I/O adapter 140. In detail, the LPARs 130 utilize their corresponding VF drivers 132 and identifiers to communicate via their corresponding VFs 150. The adjunct 122 receives a request to perform diagnostics of the I/O adapter 140. In some embodiments, the request to perform diagnostics comes from the management system 105 (e.g., from a user that is requesting a testing procedure, from a user that previously scheduled diagnostics). In some embodiments, the request comes from the hypervisor 120. In some embodiments, the request comes from the I/O adapter 140 (e.g., self-tests, previously received and scheduled tests). The adjunct 122 selects a portion of the virtual function space 146 for performance of diagnostics. The adjunct 122 and/or the hypervisor 120 perform diagnostics utilizing unused resources of the virtual function space 146 in combination with the physical functions 142 to perform diagnostics and testing of the I/O adapter 140.

Sometimes, resources such as memory and processing of the I/O adapter 140 are unavailable in the virtual function space 146. Unavailability may be related to improper functionality of an I/O adapter 140 or may be related to an I/O adapter 140 currently being in use. For example, an active LPAR may be identified as potentially problematic or operating outside of known good parameters. In another example, a portion of the virtual function space 146 that requires testing may be currently assigned to provide functionality to an LPAR. In these examples, a request for providing diagnostics, may trigger error handling concurrent diagnostics. Upon receiving a request to perform diagnostics and based on determining that the diagnostics conflict with an active client, the conflicting LPAR may be instructed to perform an error handling procedure. The error handling procedure may be part of an existing protocol, such as a standard's-based error handling procedure.

During the error handling procedure, the instructed LPAR operates in an error-recovery state, such as a frozen state. While in the error-recovery state, the instructed LPAR stops communication with the I/O adapter 140. While in the error-recovery state, the instructed LPAR may periodically poll the hypervisor 120 or the adjunct 122 to request status of the I/O adapter 140. The instructed LPAR may automatically poll for availability of VFs that were previously assigned to it, such as part of a standard recovery procedure preset in the instructed LPAR. During the error-recovery state (e.g., while the instructed LPAR operates in an error-recovery state), the hypervisor 120 or the adjunct 122 may communicate unavailability of the I/O adapter 140. In some embodiments, while in the error-recovery state, the requests of the instructed LPAR are ignored. For example, an LPAR may request to communicate with a client, a hypervisor, or another LPAR. The requests to communicate from the LPAR may not be acknowledged during an error-recovery state.

While the instructed LPAR is in the error-recovery state, the I/O adapter 140 continues to serve other LPARs, the hypervisor 120, and the adjunct 122. For example, LPAR 130-2 may be instructed to operate in an error-recovery state. Continuing the example, I/O adapter 140 may perform tests on itself by utilizing the virtual functions space 146 that includes virtual functions 150-2. Testing may include, latency tests, loopback tests, or other I/O tests appropriate in the art. Further continuing the example, LPAR 130-1 may continue to communicate through driver 132-1 to virtual functions 150-1 in the virtual functions space 146 and I/O adapter 140 may continue to serve the requests of LPAR 130-1. Further continuing the example, after testing is complete, the I/O adapter 140 may stop using VFs 150-2. Finalizing the example, LPAR 130-1 may receive communication that the I/O adapter 140 recovered from error, and LPAR 130-1 may finalize any error handling and recovery procedures and then automatically resumes communication with I/O adapter 140.

The adjunct 122 may instruct an LPAR 130 that the I/O adapter is currently in an I/O error state, to recover. For example, while LPAR 130-1 is in an error recovery, and adjunct 122 may communicate with driver PF 124 to PF 142 to re-enable VFs 150-1. In some embodiments, the same entity that instructed an LPAR to operate in an error-recovery state may communicate that the I/O adapter 140 is again available. In some embodiments, a first entity instructs an LPAR to operate in an error-recovery state and a second entity communicates to the LPAR that the I/O adapter 140 is again available. For example, I/O adapter 140 may communicate LPAR 130-1 to operate in an error recovery, and responsively LPAR 130-1 polls a cache (not depicted) of hypervisor 120 for a flag indicating that I/O adapter 140 is again available. Continuing the example, after the performance of a test by I/O adapter 140 and adjunct 122, adjunct 122 communicates I/O adapter 140 availability to hypervisor 120. Finalizing the example, in response to the communicated availability from the adjunct 122, hypervisor 120 sets the flag indicating that I/O adapter 140 is again available. In some embodiments, multiple LPARs are told to enter an error-recovery state. In some embodiments, all LPARs are told to enter an error-recovery state. For example, all LPARs 130 are told to enter an error-recovery state.

Figure 2:
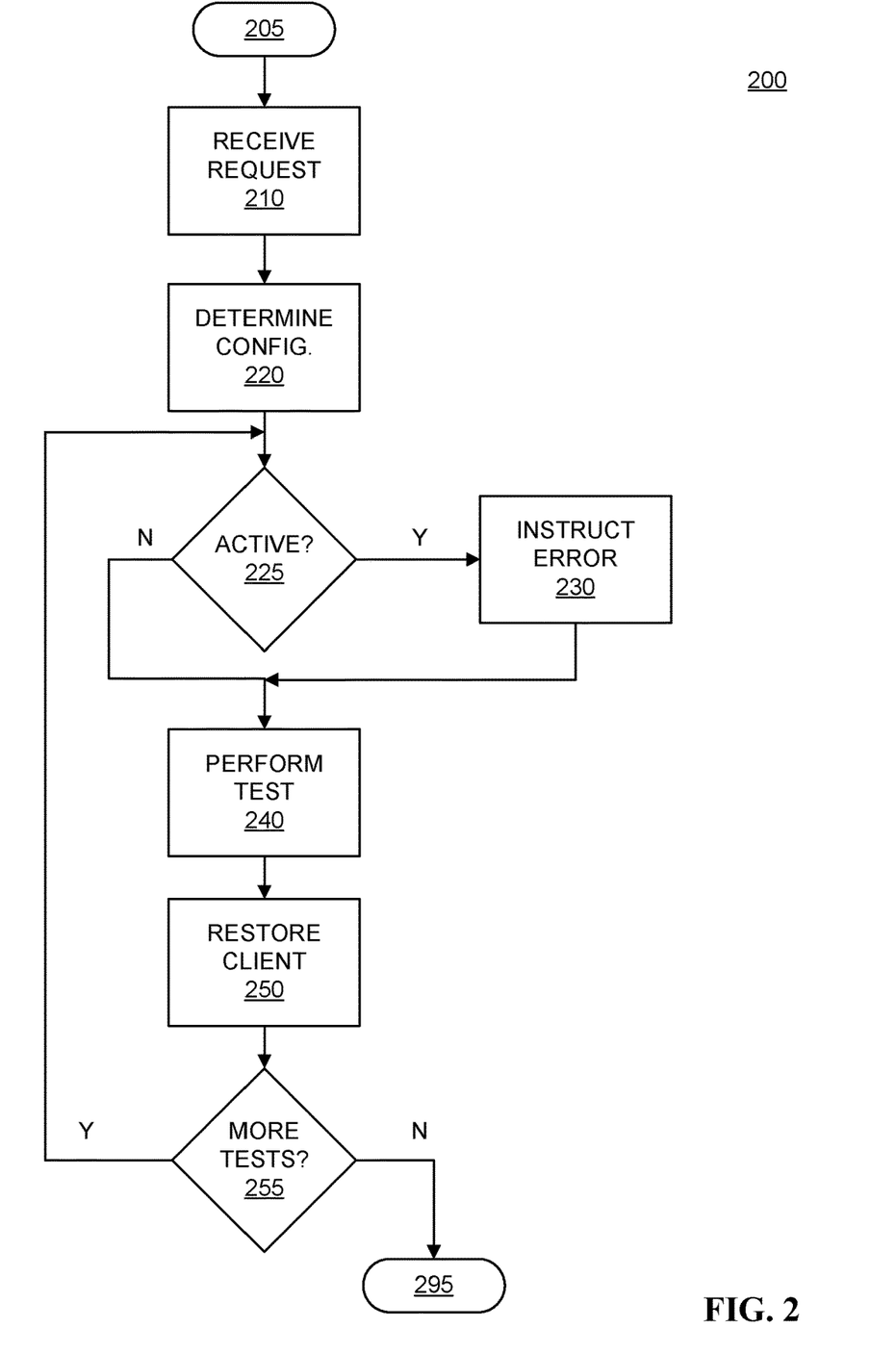
FIG. 2 depicts an example method for performing one or more aspects of error handling concurrent diagnostics, consistent with embodiments of the disclosure.

FIG. 2 depicts an example method 200 for performing one or more aspects of error handling concurrent diagnostics, consistent with embodiments of the disclosure. Method 200 may be executed by a computer system, such as the computer system depicted in FIG. 1. Method 200 may be executed by an I/O adapter, such as a multi-client network adapter. Method 200 may be executed by a hypervisor, an adjunct of the hypervisor dedicated to an I/O adapter, or some combination. Method 200 may be performed by multiple components of a computer system. For example, a hypervisor may perform certain aspects and an I/O adapter may perform other aspects of method 200.

Method 200 begins at 205. A request for performing diagnostics is received at 210. The request may be received from a hypervisor or an adjunct. The request may be received, at 210, from a hardware management console, such as received by a user or another computer system over a network. The request may be received from an I/O adapter, such as from a memory of the I/O adapter. The diagnostics may be a single test, such as a loopback test. The diagnostics may be from a plurality of tests, such as a procedure that involves multiple individual tests.

At 220, a configuration of the I/O adapter is determined. The configuration, determined at 220, may be based on a list of clients (e.g., LPARs) that are assigned to the I/O adapter. The configuration may be generated by the I/O adapter. For example, the I/O adapter may include a non-volatile memory for storing configurations and identifiers related to one or more clients (e.g., LPARs) assigned to receive input resources and output resources from the I/O adapter. Continuing the example, in the event of a scheduled shutdown, or power failure, the I/O adapter can determine the configuration from the memory. The configuration may be determined from another component of a computer system, such as the adjunct or the hypervisor. For example, the I/O adapter may receive a configuration that lists all the clients from the adjunct. Continuing the example, the I/O adapter may receive an updated configuration from the adjunct as clients are created and assigned I/O resources from the hypervisor. The configuration may be in the form of a list of clients and requested resources. The list of clients may include an identifier unique to each client (correspondingly, each client may use the identifier as part of communication with the I/O adapter). The requested resources may include the amount of resources and type of resources.

It is determined if the I/O adapter is actively serving I/O requests to clients at 225. The determination of active clients, at 225, may be based on the configuration, determined at 220. The determination, at 225, may be based on whether the I/O adapter determines if it is actively serving clients. The determination, at 225, may be made by the I/O adapter. For example, the I/O adapter includes a recent request queue, and the I/O adapter compares the recent request queue to the configuration, determined at 220, to identify active clients. In a second example, the I/O adapter scans the configuration, determined at 220, to identify active clients (even if those clients are idle or have not recently utilized the virtual functions of the I/O adapter). The determination, at 225, may be made by the hypervisor and/or adjunct. For example, the hypervisor may monitor all traffic between the clients and the I/O adapter and determine if any clients are active based on the monitored traffic.

If there are active clients, at 225, a computer system (or a computer system component) is instructed to enter an I/O error state at 230. The computer system component instructed, at 230, may be the hypervisor. The computer system component instructed, at 230, may be an I/O adapter or a virtual function space of an I/O adapter assigned to one or more clients. In some embodiments, the computer system component instructed, at 230, may be one or more clients hosted on the computer system (e.g., a fifth LPAR on a server that is simultaneously hosting 101 LPARs, a first and a fourth LPAR of twenty hosted LPARs). The clients may be instructed, at 230, based on the received request to perform diagnostics, at 210. In detail, a received request may include a request for a test that requires the use of virtual functions that are currently assigned to a given client. For example, a test that requires a memory address and/or I/O ports that are assigned to the given client. The given client may, consequently, be identified as one that needs to enter an error recovery. In some embodiments, as part of the instructed error state, at 230, the I/O adapter may be notified that the client has entered an error recovery. For example, a hypervisor and/or adjunct may communicate to an I/O adapter that a client that received an I/O error instruction is now in the error recovery.

While in the error recovery, the client may perform a procedure or activity while the client does not have I/O resources (e.g., a network outage). In some embodiments, a routine may be provided by the hypervisor or another component of the system. Performance during the I/O error state may be based on a system-wide protocol for resolving an outage or loss of communication with the rest of the computer (e.g., a PCI Express error handling state). The I/O error state may be communicated to another portion of the computer system, such as a client communicating to the hypervisor that it does not have availability of any virtual function resources of an I/O adapter. As part of instructing a given client to enter an I/O error state, at 230, an I/O adapter may ignore requests or communications from the given client for a time frame (e.g., 10 milliseconds).

In some embodiments, a computer system (or a computer system component) is instructed to enter an I/O error state at 230. A client may, consequently determine that the computer system is in the I/O error state. For example, a client may transmit a request to the computer system. The computer system may ignore the requests of the client. Upon determining that one or more requests of the client have been ignored, the client may then determine that computer system is operating in an I/O error state. In another example, a client may determine based on a lack of data being sent to the client from an I/O adapter component of the computer system, that the computer system is in an I/O error state.

In some embodiments, a testing procedure may be too long to be performed concurrently with a single error recovery. In detail, a testing procedure may consist of two or more individual tests. A given client hosted on an I/O adapter may have a timeout value or threshold. The given client may initiate a new request (e.g., to the hypervisor or adjunct), if the given client does not recover before the threshold (e.g., 700 milliseconds, 5 seconds). In the event that the testing procedure is longer than a given client's timeout value, the testing procedure could be split into the individual tests.

After the error state was instructed, at 230, (or if there were no active clients at 225), the I/O adapter tests may be performed at 240. The I/O adapter tests may be performed concurrently during the error recovery period of the client that is in the error recovery. For example, a given client may be performing an error diagnostics and recovery procedure that includes communicating with the hypervisor. Continuing the example, during the error state time frame, the I/O adapter no longer provides resources to the given client. In some embodiments, while a given client is in an error recovery, no other clients other than the given client are disabled by the I/O adapter. For example, the I/O adapter may continue to provide resources to other clients, the hypervisor, the adjunct, or some combination thereof. The I/O adapter test may be performed, at 240, on random resources of the I/O adapter. For example, the I/O adapter may test a first contiguous block of a memory of the I/O adapter. Continuing the example, in a future performance of testing, a second contiguous block of memory that is not the same as the first contiguous block is selected at random to be tested.

The I/O adapter tests may include loopback tests, latency tests, or testing of other ancillary functions of the I/O adapter. For example, an I/O adapter receives, at 210, a request to test a memory subsystem of the I/O adapter. Continuing the example, testing, at 240, may include addressing, writing to, and/or accessing memory of the I/O adapter. The testing may be performed, at 240, by the I/O adapter. Performance of the testing, at 240, may include communicating the results of the tests to another component of the computer system, such as the hypervisor and/or adjunct. Performance of the testing, at 240, may be performed by a client of the computer system dedicated to performing tests. For example, a diagnostics LPAR may operate in an idle state until the request is received, at 210. Continuing the example, the diagnostics LPAR communicates with the I/O adapter to perform testing of the I/O adapter, at 240.

In some embodiments, a client that was instructed to operate in an error recovery, at 230, may perform the testing, at 240. For example, a first LPAR may be instructed to begin I/O recovery from an error. The first LPAR operates on the mistaken assumption that the I/O adapter is unavailable and communicates with the hypervisor and begins to initiate a predetermined error recovery. The hypervisor and/or adjunct may provide elevated privileges to the first LPAR, such as the ability to access certain functions or resources of the I/O adapter not normally associated with the LPAR for normal communication with the I/O adapter. The hypervisor and/or adjunct may create a new identifier and update the configuration of the I/O adapter to include the identifier as part of providing elevated privileges to the first LPAR. The hypervisor and/or adjunct instruct the first LPAR to perform a test with the I/O adapter and to obtain the results of the test. The first LPAR may communicate the results to the hypervisor and/or adjunct. The first LPAR may retrieve the results from a memory of the first LPAR. Finalizing the example, after the test is performed and the results are obtained by the first LPAR, the hypervisor and/or adjunct may remove the elevated privileges from the first LPAR.

After the tests are performed, at 240, the client (that was operating an error recovery) is restored at 250. The client may be restored by communicating the availability of the I/O adapter to the client. The client may be restored by communicating that the client should switch from an error recovery to another state (e.g., an active state). The client may be restored by allowing the client to complete an error recovery procedure. For example, as part of being in an error recovery, an LPAR may continuously poll a hypervisor for the status of an I/O adapter as the first part of an error recovery procedure. Continuing, the example, as part of being restored, the hypervisor updates such that upon polling again, the LPAR determines that the I/O adapter is available and proceeds to a subsequent part of the error recovery procedure.

The communication may be performed by the computer system or a component of the computer system, such as the hypervisor, the adjunct, the I/O adapter, or some combination thereof. In some embodiments, the configuration of the I/O adapter is altered as part of restoring the client. For example, to perform some tests an I/O adapter may need to reapportion or reassign certain resources (e.g., memory of the I/O adapter, processing cycles of an ASIC of the I/O adapter, I/O registers, I/O ports). Continuing the example, before the client is told to recover from the I/O error state of the I/O adapter, the original configuration is restored such that upon recovery, the client may immediately resume communication with the I/O adapter.

After the client is restored, at 250, it is determined if there are more tests to be performed at 255. There may be more tests if a testing procedure was a multi-part test and only a portion of the multi-part test (e.g., a first test of three tests) has been completed. There may be more tests if a new request to perform testing was received. If there are more tests, at 255, then method 200 proceeds to again determine if there any active clients, at 225. If there are no more tests, at 255, the method 200 ends at 295.

FIG. 3 depicts the representative major components of an example computer system (computer) 301 that may be used, in accordance with embodiments of the present disclosure. It is appreciated that individual components may vary in complexity, number, type, and\or configuration. The particular aspects disclosed are for example purposes only and are not necessarily the only such variations. The computer system 301 may comprise a processor 310, memory 320, an input/output interface (herein I/O or I/O interface) 330, and a main bus 340. The main bus 340 may provide communication pathways for the other components of the computer system 301. In some embodiments, the main bus 340 may connect to other components such as a specialized digital signal processor (not depicted).

The processor 310 of the computer system 301 may be comprised of one or more cores 312A, 312B, 312C, 312D (collectively 312). The processor 310 may additionally include one or more memory buffers or caches (not depicted) that provide temporary storage of instructions and data for the cores 312. The cores 312 may perform instructions on input provided from the caches or from the memory 320 and output the result to caches or the memory. The cores 312 may be comprised of one or more circuits configured to perform one or methods consistent with embodiments of the present disclosure. In some embodiments, the computer system 301 may contain multiple processors 310. In some embodiments, the computer system 301 may be a single processor 310 with a singular core 312.

The memory 320 of the computer system 301 may include a memory controller 322. In some embodiments, the memory 320 may comprise a random-access semiconductor memory, storage device, or storage medium (either volatile or non-volatile) for storing data and programs. In some embodiments, the memory may be in the form of modules (e.g., dual in-line memory modules). The memory controller 322 may communicate with the processor 310, facilitating storage and retrieval of information in the memory 320. The memory controller 322 may communicate with the I/O interface 330, facilitating storage and retrieval of input or output in the memory 320.

The I/O interface 330 may comprise an I/O bus 350, a terminal interface 352, a storage interface 354, an I/O device interface 65, and a network interface 358. The I/O interface 330 may connect the main bus 340 to the I/O bus 350. The I/O interface 330 may direct instructions and data from the processor 310 and memory 320 to the various interfaces of the I/O bus 350. The I/O interface 330 may also direct instructions and data from the various interfaces of the I/O bus 350 to the processor 310 and memory 320. The various interfaces may include the terminal interface 352, the storage interface 354, the I/O device interface 65, and the network interface 358. In some embodiments, the various interfaces may include a subset of the aforementioned interfaces (e.g., an embedded computer system in an industrial application may not include the terminal interface 352 and the storage interface 354).

Logic modules throughout the computer system 301—including but not limited to the memory 320, the processor 310, and the I/O interface 330—may communicate failures and changes to one or more components to a hypervisor or operating system (not depicted). The hypervisor or the operating system may allocate the various resources available in the computer system 301 and track the location of data in memory 320 and of processes assigned to various cores 312. In embodiments that combine or rearrange elements, aspects and capabilities of the logic modules may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
receiving a request to perform a testing procedure on a multi-client adapter, the multi-client adapter capable of hosting network connectivity for multiple clients simultaneously, the multi-client adapter operating within a computing system;
determining a client adapter configuration for the multi-client adapter, the client adapter configuration listing clients that are assigned to the multi-client adapter;
instructing, in response to the received request and based on the determined client adapter configuration, a computer system component to operate in an I/O error state, the I/O error state having a time frame for recovery of a first client of the clients assigned to the multi-client adapter;
performing, during the time frame for recovery and based on the received request, a first adapter test of the testing procedure on the multi-client adapter,
wherein the first client of the clients assigned to the multi-client adapter has a timeout threshold, and wherein the testing procedure is longer than the timeout threshold, and wherein the testing procedure includes a plurality of tests, and wherein each test of the plurality of tests is shorter than the timeout threshold; and
instructing the computer system to operate in an active state, the active state causing the multi-client adapter to resume a network connection for the first client.

2. The method of claim 1, wherein the client adapter configuration is stored in a memory of the multi-client adapter, and wherein the determining includes retrieving the client adapter configuration from the memory of the multi-client adapter.

3. The method of claim 1, wherein the client adapter configuration is received from a hypervisor of the computer system.

4. The method of claim 1, the method further comprising:
initiating, after the instructing the computer system to operate in the active state and based on the received request, the computer system to operate in the I/O error state, the I/O error state having a second time frame for recovery of the first client; and
performing, during the second time frame for recovery and based on the received request, a second adapter test of the testing procedure on the multi-client adapter.

5. The method of claim 1, the method further comprising:
initiating, after the instructing the computer system to operate in the active state and based on the received request, the computer system to operate in a second I/O error state, the second I/O error state having a second time frame for recovery of a second client of the clients assigned to the multi-client adapter; and
performing, during the second time frame for recovery and based on the received request, a second adapter test of the testing procedure on the multi-client adapter.

6. The method of claim 1, wherein the performing a first adapter test comprises the following:

transmitting, to a second client of the clients assigned to the multi-client adapter, test data related to the first adapter test; and causing the second client of the clients assigned to the multi-client adapter to perform aspects of the first adapter test.

7. The method of claim 6, wherein the second client is a diagnostics client.

8. The method of claim 1, wherein the performing the first adapter test comprises:

transmitting, to the first client, test data related to the first adapter test; and causing the first client to perform aspects of the first adapter test.

9. The method of claim 1, wherein before the I/O error state the multi-client adapter hosts one or more network connections for every client in the client adapter configuration listing, and wherein during the I/O error state the multi-client adapter does not disable the one or more network connections for every client, and wherein during the I/O error state the multi-client adapter does disable the first client.

10. A system comprising:

a multi-client adapter;

a memory, the memory containing one or more instructions; and a processor, the processor communicatively coupled to the memory, the processor in response to the one or more instructions configured to:

receive a request to perform a testing procedure on the multi-client adapter, the multi-client adapter capable of hosting network connectivity for multiple clients simultaneously, the multi-client adapter operating within a computing system;

determine a client adapter configuration for the multi-client adapter, the client adapter configuration listing clients that are assigned to the multi-client adapter;

instruct, in response to the received request and based on the determined client adapter configuration, a computer system component to operate in an I/O error state, the I/O error state having a time frame for recovery of a first client of the clients assigned to the multi-client adapter;

perform, during the time frame for recovery and based on the received request, a first adapter test of the testing procedure on the multi-client adapter, wherein the first client of the clients assigned to the multi-client adapter has a timeout threshold, and wherein the testing procedure is longer than the timeout threshold, and wherein the testing procedure includes a plurality of tests, and wherein each test of the plurality of tests is shorter than the timeout threshold; and instruct the computer system to operate in an active state, the active state causing the multi-client adapter to resume a network connection for the first client.

11. The system of claim 10, wherein the processor is located on the multi-client adapter.

12. The system of claim 10, wherein the memory is located on the multi-client adapter, wherein the client adapter configuration is stored in the memory, and wherein the determining includes retrieving the client adapter configuration from the memory of the multi-client adapter.

13. The system of claim 10, wherein the client adapter configuration is received from a hypervisor of the computer system.

14. The system of claim 10, wherein the processor is further configured to:

initiate, after the instructing the computer system to operate in the active state and based on the received request, the computer system to operate in a second I/O error state, the second I/O error state having a second time frame for recovery of a second client of the clients assigned to the multi-client adapter; and perform, during the second time frame for recovery and based on the received request, a second adapter test of the testing procedure on the multi-client adapter.

15. A computer program product, the computer program product comprising a computer readable storage medium having program instructions embodied therewith, the program instructions configured to:

receive a request to perform a testing procedure on the multi-client adapter, the multi-client adapter capable of hosting network connectivity for multiple clients simultaneously, the multi-client adapter operating within a computing system;

determine a client adapter configuration for the multi-client adapter, the client adapter configuration listing clients that are assigned to the multi-client adapter;

instruct, in response to the received request and based on the determined client adapter configuration, a computer system component to operate in an I/O error state, the I/O error state having a time frame for recovery of a first client of the clients assigned to the multi-client adapter;

perform, during the time frame for recovery and based on the received request, a first adapter test of the testing procedure on the multi-client adapter, wherein the first client of the clients assigned to the multi-client adapter has a timeout threshold, and wherein the testing procedure is longer than the timeout threshold, and wherein the testing procedure includes a plurality of tests, and wherein each test of the plurality of tests is shorter than the timeout threshold; and instruct the computer system to operate in an active state, the active state causing the multi-client adapter to resume a network connection for the first client.

16. The computer program product of claim 15, wherein the perform a first adapter test comprises the following:

transmit, to a second client of the clients assigned to the multi-client adapter, test data related to the first adapter test; and cause the second client of the clients assigned to the multi-client adapter, to perform aspects of the first adapter test.

17. The computer program product of claim 15, wherein before the I/O error state the multi-client adapter hosts one or more network connections for every client in the client adapter configuration listing, and wherein during the I/O error state the multi-client adapter does not disable the one or more network connections for every client except the first client.

* * * * *